United States Patent Office 3,262,965
Patented July 26, 1966

3,262,965
FLUORONITRILES AND METHOD OF
MAKING THE SAME
George J. Janz, Troy, N.Y., assignor to Union Carbide
Corporation, New York, N.Y., a corporation of New
York
No Drawing. Filed Oct. 30, 1964, Ser. No. 407,898
12 Claims. (Cl. 260—465.7)

This application is a continuation-in-part of my prior application Serial No. 106,485, filed May 1, 1961, and now abandoned.

This invention relates to a novel method of making fluoronitriles and to a series of new fluoronitriles that can be made by this method.

The present method is of the type generally referred to as telomerization, that is, a process involving the formation of short polymer chains by chain transfer of a polymer radical with a substance other than the monomer. Such telomerization reactions are extensively discussed in a review of the literature on telomerization by R. B. Fox and D. E. Field, U.S. Naval Research Laboratory Report 5190 (Nov. 19, 1958). As indicated in this Report, the monomer in the telomeric reaction is commonly referred to as a taxogen and the substance other than the monomer is referred to as the telogen.

It is known that certain omega-halogenoalkyl nitriles can be formed by reacting ceratin chloroalkylnitriles such as chloromethyl nitrile with an olefin such as ethylene or propylene in a telomeric reaction. For example, trichloroacetonitrile (a telogen) enters into a telomeric reaction with ethylene (a taxogen) to yield an omega-halogenoalkyl nitrile (a telomer) having the structural formula Cl(CH$_2$CH$_2$)$_n$CCl$_2$—CN. This reaction and a number of closely related reactions are disclosed in U.S. Patent 2,615,915.

It has now been found that perfluoroalkyl nitriles can be reacted with mono-olefins in accordance with the conditions set forth below to cause a telomeric reaction to proceed by a reaction mechanism that is quite different from that described in U.S. Patent 2,615,915. This novel reaction may be represented by the following equation:

RCN+nR'→R(R')$_n$CN

In this equation RCN is the telogen and R' the taxogen. R is a perfluoroalkyl radical having one to three carbon atoms, R' is a mono-olefin of two to eight carbon atoms, and "n" is one to three. It should be noted that in the present method the taxogen is interposed between the perfluoroalkyl and nitrile portions of the telogen, whereas in the reactions dsecribed in U.S. Patent 2,615,915 the taxogen is interposed between one of the halogens and the omega carbon of the haloalkylnitrile. It is thus apparent that the present process involves a splitting of the bond between the carbon of the nitrile group and the adjacent carbon of the haloalkyl group, whereas the prior process involves the splitting of a carbon-halogen bond.

As indicated above, the fluoronitriles formed in the present process are believed to be new compounds and are useful per se as well as being useful as intermediates for a variety of end uses. Thus it has been found that 4,4,4-trifluorobutyronitrile and 6,6,6-trifluorocapronitrile prepared as described below are useful as grain fumigants against such insects as the rice weevil and confused flour beetle. Also, the present nitriles can be hydrolyzed under known conditions to produce relatively strong fluoroalkanoic acids. For example, 4,4,4-trifluorobutyronitrile can be hydrolyzed to yield gamma-trifluorobutanoic acid having an ionization constant of 7×10$^{-5}$ as compared with a value of 1.5×10$^{-5}$ for the unsubstituted butanoic acid. An omega trifluoro group improves the chemical and thermal stability of compounds into which it is introduced and hence the trifluorobutanoic acid and its homologues can be used as a means of introducing stabilizing trifluoro groups into a variety of organic compounds used as drugs, dyes, heat transfer media, solvents, etc. Also, the acid can be condensed with a diol to produce a perfluoro-terminated diester that can be used as a component of high pressure lubricant compositions.

In carrying out a preferred embodiment of the present process, the perfluoroalkyl nitrile is mixed with the olefin and heated to a temperature preferably within the range of 300° to 500° C. The molar ratio of perfluoroalkyl nitrile to olefin employed depends upon the nature of the product desired and may be greater than or less than 1:1. In general, the higher ratios of nitriles to olefin tend to favor the formation of addition products containing one mol of taxogen per mol of telogen, whereas low ratios tend to favor the formation of telomers containing more than one mol of taxogen per mol of telogen.

While the reaction starts as soon as the reactants are brought together at the reaction temperature, the reaction mixture is desirably heated over a period of at least several hours to produce a good yield of the telomer. As pointed out below, the time required to achieve any given yield of product can be reduced by the use of a catalyst. Satisfactory yields can be obtained at atmospheric pressure. At the end of the reaction period the reaction mixture is cooled to solidify the reaction products and is then warmed to yield a liquid which, as indicated in the specific examples given below, may be a mixture of compounds.

For example, when a relatively low nitrile-olefin ratio is used, the reaction product may comprise a mixture of a telomer containing one mol of taxogen and homologous telomers containing more than one mol of taxogen. Also, it has been found that the ethylenic carbon atoms of the olefin are the reactive carbon atoms in the present process, and hence in the case of olefins having three or more carbon atoms, isomeric forms are possible and mixtures of isomers may be formed. To illustrate the structure of these isomers, the general formula for the present products given above may be elaborated as follows:

$$R\left(\begin{matrix}CH-CH\\ | \phantom{xx} | \\ R_1 \phantom{x} R_2\end{matrix}\right)_n CN$$

wherein R and $n$ are defined as above, and R$_1$ and R$_2$ are selected from hydrogen and alkyl groups of one to six carbon atoms. Typical compounds falling within the scope of this general formula are CF$_3$CH$_2$CH$_2$CN, CF$_3$(CH$_2$CH)$_2$CN, CF$_3$CF$_2$CH$_2$CH$_2$CN,
CF$_3$CH(CH$_3$)CH$_2$CN, CF$_3$CH$_2$CH(CH$_3$)CN,
CF$_3$CF$_2$CF$_2$CH$_2$CH$_2$CN, CF$_3$CF$_2$CF$_2$CH(CH$_3$)CH$_2$CN,
CF$_3$CF$_2$CF$_2$CH$_2$CH(CH$_3$)CN, CF$_3$CH(C$_2$H$_5$)CH$_2$CN,
CF$_3$CH$_2$CH(C$_2$H$_5$)CN, CF$_3$CH(C$_6$H$_{13}$)CH$_2$CN,
and CF$_3$CH$_2$CH(C$_6$H$_{13}$)CN.

Separation of the homologous telomers can be effected by a variety of known techniques including fractional distillation, mass spectrometry and gas chromatography. Ordinarily, no useful purpose is served by separating the isomeric species of the present products. However, such separation can be effected by mass spectrometry or gas chromatography if desired.

While I do not wish to be bound by any particular theory as to the mechanism of the present process, it is my present belief that the process proceeds by a free-radical and/or ionic mechanism. This hypothesis is supported by the fact that the rate of the present reaction can be materially increased by employing catalysts of the type known to be effective in free-radical polymerizations, e.g., organic peroxide catalysts such as tertiarybutyl peroxide and ethylene oxide.

In order to point out more fully the nature of the present invention, the following specific examples are given of illustrative embodiments of the process of the invention and the products made thereby.

*Example I*

A reactor was charged with 479 parts by weight of trifluoroacetonitrile and 140 parts of ethylene, and the mixture of reactants was heated under atmospheric pressure at a temperature of 400° C. for 92 hours. At the end of this time the reaction products were cooled to the temperature of liquid nitrogen to freeze them. Thereafter, the products were gradually warmed in stages, first to Dry Ice temperature, then to ice temperature, and finally to room temperature. The warming of the reaction product to room temperature was effected in stages to avoid possible entrainment of product liquid by the gaseous products that vaporize during this period.

The product that remained liquid at room temperature comprised 341 parts by weight and the yield was 59.5% based on the $CF_3CN$ used. It was separated by fractional distillation and found to comprise essentially two components distilling at 140° C. and 198° C., respectively. The lower-boiling component constituted about 60 weight percent of the total liquid product.

Analysis of the low-boiling product gave the following results for the formula $C_4H_4F_3N$: Theor. H, 3.3; N, 11.4; F, 46.3. Found: H, 3.44, 3.48; N, 11.30, 11.07; F, 45.55, 45.83. This fraction had a density at 24.5° C. of 1.21±0.03 grams/ml. and a refractive index $n_D^{24.5}$ of 1.565. The presence of CN and $CF_3$ groups in both products was established by nuclear magnetic resonance spectroscopy, mass spectrometry, and infra-red spectrum analysis. The analytical results showed that the fraction boiling at 140° C. was $CF_3CH_2CH_2CN$ and that the fraction boiling at 198° C. was $CF_3CH_2CH_2CH_2CH_2CN$.

*Example II*

A reactor was charged with 427 parts of $CF_3CN$ and 126 parts of $C_2H_4$ and the mixture heated under atmospheric pressure at a temperature of 449° C. for 46.2 hours. The liquid product recovered after cooling and warming the reaction products as in Example I amounted to 360 parts, which was equivalent to a yield of 66.5% based on the $CF_3CN$ used. Analysis of the liquid product showed that it had a composition similar to that of Example I.

*Example III*

The procedure of Example I was followed except that the reaction temperature was 348° C. and the reaction time was 20.3 hours. The liquid reaction product recovered amounted to only 35.6 grams as compared with 341 grams in Example I.

*Example IV*

Equi-molar quantities of perfluoropropionitrile and ethylene were heated at 415° C. for a period of twenty hours in accordance with the procedure of Example I. A liquid addition product was obtained which analysis showed contained $CF_3CF_2CH_2CH_2CN$.

*Example V*

A mixture of 407 parts of $CF_3CN$ and 119 parts of ethylene with 246 parts of di-t-butyl peroxide was heated at 358° C. in accordance with the procedure of Example I. The reaction velocity was increased about thirty-fold as compared with a reaction carried out under the same conditions but wherein no tertiarybutyl peroxide catalyst was used. The composition of the addition product is the same as that obtained in Example I.

*Example VI*

A mixture of 960 parts of $CF_3CN$ and 46 parts of propylene was heated at 400° to 420° C. for a period of three to four hours. The product obtained was a clear colorless liquid comprising 120 parts of addition product, 870 parts of $CF_3CN$ and 10 parts of propylene. The separated addition product consisted of equi-molar quantities of the $CF_3CN$ and propylene and had a boiling point of 150° C. Analysis of the product showed that it comprised a mixture of about 10% $CF_3CH(CH_3)CH_2CN$ and about 90% $CF_3CH_2CH(CH_3)CN$.

*Example VII*

A reactor was charged with 1340 parts of perfluorobutyronitrile ($CF_3CF_2CF_2CN$) and 33 parts of ethylene ($CH_2=CH_2$) and the resulting mixture was heated at 400° C. at an initial pressure of 717 mm. The molar ratio of the nitrile to the olefin was 6.7:1 in the initial charge. After three hours the pressure had decreased to 652 mm. and the reaction was stopped for product anaylsis. About 150 parts of liquid addition product was obtained having an equi-molar ratio of ethylene to nitrile. Analysis indicated that the product was $$CF_3CF_2OF_2CH_2CH_2CN$$

*Example VIII*

A reactor was charged with 1340 parts of perfluorobutyronitrile ($CF_3CF_2CF_2CN$) and 57 parts of propylene ($CH_3CH=CH_2$) and the resulting mixture heated at 402° C. at an initial pressure of 744 mm. The molar ratio of nitrile to olefin was 5:1 in the initial charge. At the end of three hours, when the pressure had decreased to 694 mm., the reaction was stopped for product analysis. About 210 parts of liquid addition product was obtained containing equi-molar quantities of the nitrile and propylene. Analysis of the product showed that it very largely comprised the isomer $$CF_3CF_2CF_2CH_2CH(CH_3)CN$$

and contained small amounts of $$CF_3CF_2CF_2CH(CH_3)CH_2CN$$

*Example IX*

A reactor was charged with 815 parts of perfluoroacetonitrile ($CF_3CN$) and 45 parts of butene-2 (46% cis, 54% trans) and the mixture heated at 402° C. at an initial pressure of 785 mm. The molar ratio of nitrile to olefin was 6:1 in the initial charge. After three hours, when the pressure had decreased to 760 mm., the reaction was stopped for product analysis. About 70 parts of liquid product were obtained. Analysis of the product indicated that it was a mixture of $$CF_3CH_2CH(CH_2CH_3)CN$$

and $CF_3CH(CH_2CH_3)CH_2CN$.

*Example X*

A reactor was charged with 870 parts of perfluoroacetonitrile ($CF_3CN$) and 137 parts of octene-1 and heated at 382° C. at an initial pressure of 684 mm. The ratio of nitrile to olefin was 7.4:1 in the initial charge. After 2.9 hours, when the pressure had dropped to 658 mm., the reaction was stopped for product analysis. 169 parts of liquid product was obtained which was quite viscous and consisted of three main constituents as shown by gas chromatographic analysis. Analysis of the product indicated that it comprised a mixture of $$CF_3CH_2CH(CH_2CH_2CH_2CH_2CH_2CH_3)CN$$

and $CF_3CH(CH_2CH_2CH_2CH_2CH_2CH_3)CH_2CN$.

*Example XI*

Ethylene oxide (1.0 gm.) was added as a catalyst to a mixture of 72 gm. $CF_3CN$ and 2.8 gm. $C_2H_4$. The molar ratio of nitrile to olefin was 8.1:1.0. The mixture was heated at 438° C. and the product analyzed as in Example I. It was found that the ethylene oxide catalyst increased initial reaction rate about eighteen-fold as compared with the rate observed for the reaction of Example I.

Analysis of the product showed that it comprised a mixture of homologous telomers as in Example I. The ratio of $CF_3CH_2CH_2CN$ to $CF_3(CH_2CH_2)_2CN$ in the product was about 50:1.0.

It is of course to be understood that the foregoing examples are intended to be illustrative and to impart an understanding of the invention so that numerous changes can be made by others skilled in the art in the ingredients, proportions and conditions specifically set forth without departing from the spirit of the invention as defined in the appended claims.

I claim:
1. A compound of the general formula:

$$R\left(\begin{matrix}CH-CH\\ | \quad | \\ R_1 \quad R_2\end{matrix}\right)_n CN$$

wherein R is a perfluoroalkyl group of one to three carbon atoms, $R_1$ and $R_2$ are selected from hydrogen and alkyl groups of one to six carbon atoms, and $n$ is one to three.
2. $CF_3CH_2CH_2CN$.
3. $CF_3CH_2CH_2CH_2CH_2CN$.
4. $CF_3CF_2CH_2CH_2CN$.
5. A mixture of $CF_3CH(CH_3)CH_2CN$ and $$CF_3CH_2CH(CH_3)CN$$

6. $CF_3CF_2CF_2CH_2CH_2CN$.
7. A mixture of $CF_3CF_2CF_2CH_2CH(CH_3)CN$ and $$CF_3CF_2CF_2CH(CH_3)CH_2CN$$

8. A mixture of $CF_3CH_2CH(CH_2CH_3)CN$ and $$CF_3CH(CH_2CH_3)CH_2CN$$

9. A mixture of $$CF_3CH_2CH(CH_2CH_2CH_2CH_2CH_2CH_3)CN$$

and $CF_3CH(CH_2CH_2CH_2CH_2CH_2CH_3)CH_2CN$.

10. A method which comprises heating at a temperature of 300° to 500° C. a mixture of (a) perfluoroalkyl nitrile having an alkyl group of one to three carbon atoms and (b) mono-olefin of two to eight carbon atoms to form a telomer having the formula:

$$R\left(\begin{matrix}CH-CH\\ | \quad | \\ R_1 \quad R_2\end{matrix}\right)_n CN$$

wherein R is a perfluoroalkyl radical having one to three carbon atoms, $R_1$ and $R_2$ are selected from hydrogen and alkyl groups of one to six carbon atoms and "$n$" is one to three, and recovering said telomer from the reaction mixture.

11. A method according to claim 10 and wherein the reaction mixture has incorporated therein a catalyst selected from the group consisting of t-butyl peroxide and ethylene oxide.

12. A method which comprises heating a mixture of approximately equi-molar quantities of trifluoroacetonitrile and ethylene at a temperature of 300° to 500° C. in the presence of a catalyst selected from the group consisting of t-butyl peroxide and ethylene oxide to form a mixture of compounds having the formula:

$$CF_3(C_2H_4)_nCN$$

wherein "$n$" is one to three and the components of said mixture contain different numbers of $(C_2H_4)$ groups, and recovering the compound $CF_3C_2H_4CN$ from the reaction mixture.

References Cited by the Examiner
UNITED STATES PATENTS

| | | | |
|---|---|---|---|
| 2,379,097 | 6/1945 | Niederhauser et al. | 260—465.7 |
| 2,440,800 | 5/1948 | Hanford et al. | 260—658 |

OTHER REFERENCES

Chem. Ab., vol. 47, 6859.

CHARLES B. PARKER, *Primary Examiner.*

JOSEPH P. BRUST, *Assistant Examiner.*